March 23, 1965  J. I. ROSE  3,174,359
DUAL CONTROL FOR AN AUTOMOBILE
Filed Oct. 18, 1962  2 Sheets-Sheet 1

INVENTOR.
JONATHAN I. ROSE
BY
*Cullen, Sloman & Cantor*
ATTORNEYS

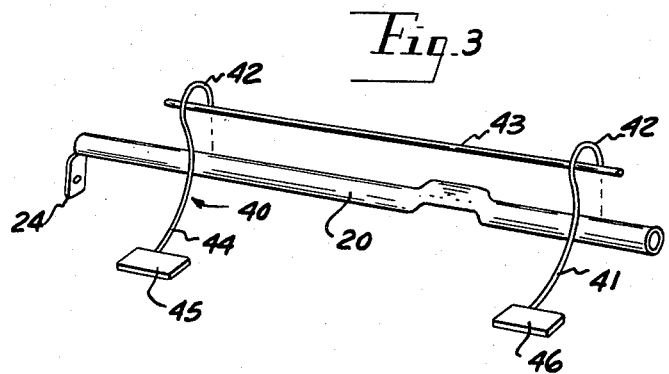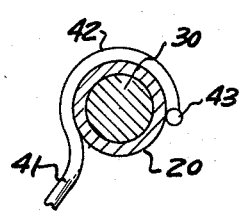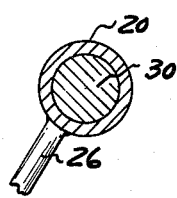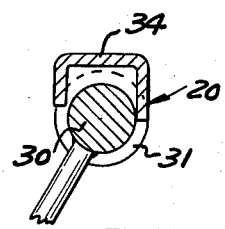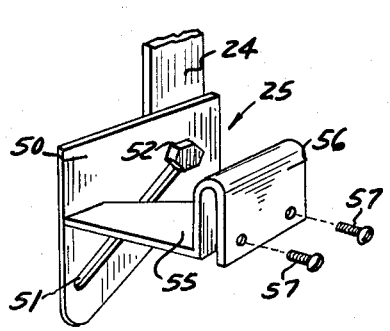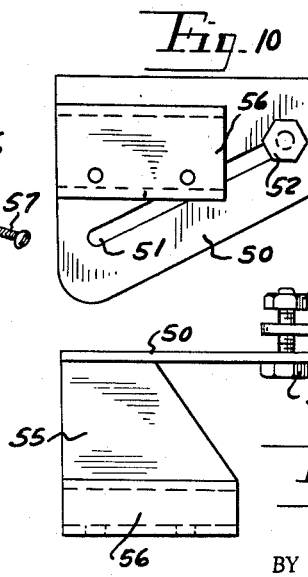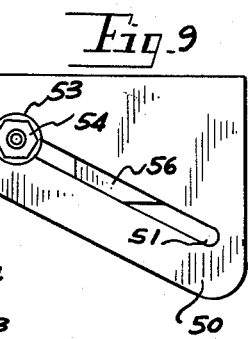
INVENTOR.
JONATHAN I. ROSE
ATTORNEY

3,174,359
DUAL CONTROL FOR AN AUTOMOBILE
Jonathan I. Rose, 1701 Balmoral Drive, Detroit, Mich.
Filed Oct. 18, 1962, Ser. No. 231,446
3 Claims. (Cl. 74—562.5)

This invention relates to a dual control for an automobile and more particularly to an auxiliary device for operating the automobile clutch, brake and accelerator pedals from the passenger seat.

An object of this invention is to provide a mechanism which can be removably installed in an automobile and which is provided with auxiliary clutch pedal, brake pedal and accelerator pedal located in the same relationship as are the corresponding pedals of the automobile and arranged for depressing the automobile pedals from the passenger's seat.

This and other objects and advantages of this invention will become apparent upon reading the following description, of which the attached drawings form a part.

In these drawings:

FIG. 3 illustrates, in perspective, a portion of the dual control mechanism and particularly the accelerator control.

Figure 2:
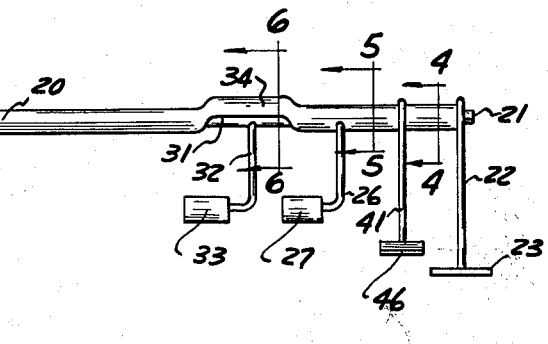
FIG. 2 is a front elevational view of the dual control mechanism, per se.

FIGS. 4, 5 and 6 are each enlarged cross-sectional views taken in the direction of arrows 4—4, 5—5, and 6—6 respectively, of FIG. 2.

FIG. 7 is an enlarged perspective view of the pedal connection bracket, and

FIGS. 8, 9 and 10 are top, rear and front views respectively, of the pedal connection bracket.

Figure 1:
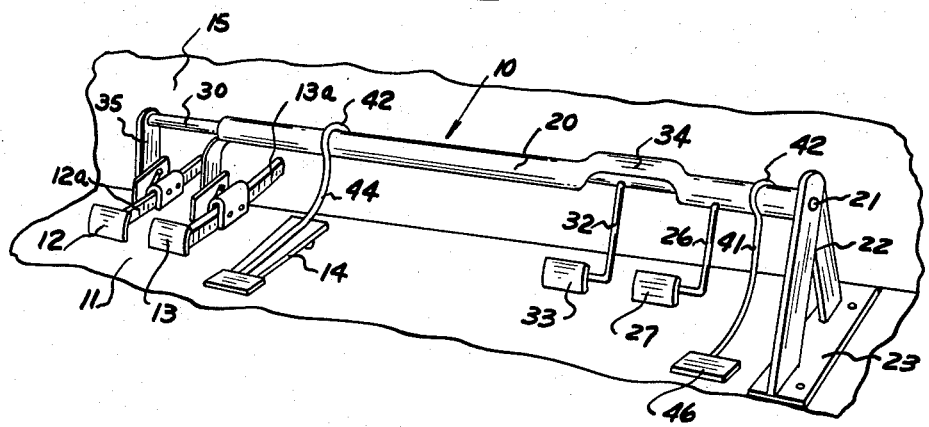
FIG. 1 is a perspective view of the dual control as installed in an automobile.

The dual control device 10 is particularly designed for use in an automobile having a floor 11, a clutch pedal 12 secured to a clutch push rod 12a, a brake pedal 13 secured on the end of the brake push rod 13a, and an accelerator 14 formed in the shape of a long flat pedal extending upwardly and forwardly from the floor. The clutch and brake push rods may extend through the fire wall 15, as illustrated in FIG. 1 or may be of the type that extend through the floor 11.

Dual brake control

The dual brake control comprises a tubular shaft 20 which is horizontally arranged and which is pivotally connected at 21 to the upright portion 22 of a bracket having a floor plate 23 which is screwed down to the floor 11. The opposite end of the shaft is extended and bent downwardly into a link 24 to which is connected a bracket 25, in turn connected to the brake push rod 13a.

Rigidly secured to the tube 20 in front of the passenger's side of the automobile is an auxiliary brake push rod 26 having an auxiliary brake pedal 27 secured to the end thereof. Hence, a passenger sitting in the passenger's seat by applying foot pressure to the auxiliary pedal 27 causes the tubular shaft 20 to rotate about its pivotal connection 21 and thus depress the brake pedal 13.

Dual clutch control

To control the clutch pedal 12, a second shaft 30 is rotatably journalled within the tubular shaft 20. The tubular shaft is slotted at 31 and extending through this slot and rigidly secured to the second shaft 30 is an auxiliary clutch push rod 32 having an auxiliary clutch pedal 33 located adjacent the auxiliary brake pedal 27, in front of the passenger's side of the automobile. The tubular shaft at the slot is upset or raised at 34 to provide stops or shoulders to limit movement of the auxiliary clutch pedal 33 as well as to reinforce the shaft.

The shaft 30 extends outwardly of the end of the tubular shaft 20 and a downwardly depending link 35 is rigidly secured to its end and connected to a bracket 25, identical but oppositely arranged, to the one previously described and in turn secured to the push rod 12a of the clutch pedal 12. Hence, the passenger, by depressing the auxiliary clutch pedal 33 causes the shaft 30 to rotate within the tubular shaft 20 so that the link 35 swings to depress the clutch pedal 12.

Dual accelerator control

As shown particularly in FIG. 3, the dual accelerator control is formed of a pair of rods 40 and 41, each having its upper end bent into a loop shape 42 for fitting over and encircling at least the top portion of the tubular shaft 20 for rotation relative to that shaft. The two looped upper ends 42 are interconnected by a rigid strip or rod 43 arranged parallel to and in line contact with the tubular shaft 20 but forwardly of that shaft so as not normally visible to one sitting in either the driver's or passenger's seat.

The lower end of the rod 40 is bent into a straight portion 44 arranged parallel to and rested upon the top surface of the automobile accelerator pedal 14. The rods are provided with auxiliary pedals 45 and 46, respectively.

Thus, the accelerator control may be removably positioned upon the shaft 20 for use or removed therefrom in cases where not needed.

Push rod connection bracket

Referring to FIGS. 7–10, the pedal push rod connection bracket is formed of a vertical plate 50 having a diagonally arranged slot 51 formed therein through which a bolt 52 is extended. The bolt is provided with a fixed position spacer 53 and a threaded nut 54. The links 24 or 35 are secured between the fixed spacer 53 and the nut 54 and the plate is loosely located in the space between the spacer 53 and the head of the bolt so that it may loosely move relative to the bolt and link. This provides a lost motion device which permits the particular brake or clutch pedal to be depressed by the driver and permits adjustment of these pedals without necessarily effecting the position of the auxiliary control pedals, although positively acting to move such pedals when the corresponding auxiliary pedals are depressed.

Rigidly secured to the vertical plate 50 is a horizontal strip 55 whose end is bent into an inverted channel 56 which receives one of the push rods 12a or 13a, the push rod being held in place in the channel by means of set screws 57 or the like.

Operation

In operation, the device may be installed in a conventional automobile, and being held in the automobile only by screws or the like passing through support plate 23, may be easily removed without damaging or in any way changing the appearance of the automobile.

Once installed, the clutch, brake and accelerator may be operated as usual by the driver and the usual self adjustments or manual adjustments of the brake and clutch pedal can take place without interference due to the lost motion bracket connection. When it is desired to control the automobile from the passenger's seat, as when the automobile is used in driver-training or when used by persons who must sit on the right side of the automobile, such as rural delivery postmen and the like, the three controls may be operated from the passenger's side by merely operating the auxiliary pedals.

This invention may be further developed within the scope of the following claims. Accordingly, it is desired that the foregoing description be read as being merely illustrative of an operative embodiment of this invention and not in a strictly limiting sense.

I now claim:

1. A dual control for an automobile having a driver's seat and driving controls located in front of it and an adjacent passenger's seat, the driver controls including an accelerator pedal in the form of a flat, horizontally and upwardly inclined depressible pedal; comprising, a horizontally arranged shaft arranged forwardly and above said pedal and extending to a point forwardly of the passenger seat; support means mounting said shaft, a pair of rods, one being an accelerator rod located above said accelerator pedal, and the other being a dual control rod located in front of the passenger seat, each rod having an upper end bent into a loop shape, looped over the upper surface of the shaft for rotation relative thereto and removably supported thereon; the free ends of the two loop shapes being rigidly interconnected by a rigid, elongated strip arranged parallel to and in contact with the shaft; the accelerator rod being bent downwardly from its looped upper end into a straight portion arranged substantially parallel to and rested upon the upper surface of the accelerator pedal, so that foot pressure applied to the rod is also applied to said accelerator pedal causing the rod to pivot relative to the shaft, and the lower free end of the dual control rod being formed into an enlarged foot pressure pad, so that foot pressure applied to said pad causes the dual control rod to pivot relative to the shaft and thus pivot the accelerator rod to depress the accelerator pedal.

2. A dual control for an automobile having a driver's seat and driving controls located in front of it and an adjacent passenger seat, the driving controls including a pair of horizontal spaced apart clutch and brake pedals, with the clutch pedal being located to the left of the brake pedal; comprising a horizontally arranged, outer tubular shaft having a left end portion arranged forwardly of and above said brake pedal, and a right end portion rotatably supported by a support bracket located forwardly of the passenger seat; a bracket secured to and depending from said left end portion for releasable securement to said brake pedal and for supporting said left end portion upon said brake pedal; and a second, inner shaft rotatably journalled within and horizontally slidable within the tubular shaft and extending outwardly of the tubular shaft left end portion and having a free end positioned above said clutch pedal; a bracket secured to said free end and depending therefrom for releasable securement to the clutch pedal; a dual control brake pedal depending from and rigidly secured to the tubular shaft in front of the passenger seat; a horizontally elongated slot formed in the tubular shaft to the left of, but near, the dual control brake pedal, and a pedal rod extending through said slot normal to said inner shaft and depending from and rigidly secured to the inner shaft at said slot, with the angular opening of the slot being considerably greater then the thickness of the rod, so that angular movement of the rod causes rotation of the inner shaft within the tubular shaft, with such angular movement of the rod being limited by the upper and lower edges of said slot; and a dual control clutch pedal formed on the lower end of said rod, wherein each of said dual control pedals may be individually depressed to thus rotate its respective shaft and thereby separately depress its respective clutch and brake pedals, and wherein the inner shaft may be horizontally slid within the tubular shaft, within the limits of the length of said slot, for positioning its bracket above the clutch pedal.

3. A construction as defined in claim 2 and said driving controls also including an accelerator pedal in the form of a forwardly and upwardly inclined depressible pedal; and including a pair of rods, one being an accelerator rod located above said pedal and the other being a dual control rod located in front of the passenger seat, each rod having an upper looped end pivotably and removably looped over and thereby connected to the tubular shaft, and an elongated rigid strip, rigidly interconnecting the two upper looped ends, the rods being otherwise free of connection to each other and to the shafts, the accelerator rod being bent downwardly from its looped upper end and having its lower end loosely rested upon the upper surface of the accelerator pedal, and the lower, free end of the dual control rod being formed into an enlarged foot pressure pad, whereby foot pressure applied to said pad causes the dual control rod to pivot relative to the tubular shaft and thus pivot the accelerator rod to depress the accelerator pedal.

References Cited by the Examiner

UNITED STATES PATENTS

| 762,179 | 6/04 | Maxam | 248—215 |
|---|---|---|---|
| 2,166,978 | 7/39 | Stack | 74—562.5 |
| 2,791,915 | 5/57 | Merry | 74—562.5 |
| 2,819,627 | 1/58 | Larson | 74—562.5 |

FOREIGN PATENTS 918,486  9/54  Germany.

BROUGHTON G. DURHAM, *Primary Examiner.*